(12) United States Patent
Yoneda et al.

(10) Patent No.: US 8,618,638 B2
(45) Date of Patent: Dec. 31, 2013

(54) SEMICONDUCTOR OPTICAL MODULATOR AND METHOD FOR MANUFACTURING THE SAME

(75) Inventors: Yoshihiro Yoneda, Yokohama (JP); Kenji Koyama, Yokohama (JP); Hirohiko Kobayashi, Yokohama (JP)

(73) Assignee: Sumitomo Electric Industries Ltd., Osaka (JP)

(*) Notice: Subject to any disclaimer, the term of this patent is extended or adjusted under 35 U.S.C. 154(b) by 32 days.

(21) Appl. No.: 13/311,837

(22) Filed: Dec. 6, 2011

(65) Prior Publication Data
US 2012/0148184 A1 Jun. 14, 2012

(30) Foreign Application Priority Data
Dec. 8, 2010 (JP) ................................. 2010-273700

(51) Int. Cl.
*H01L 29/06* (2006.01)
*H01L 21/00* (2006.01)
*G02B 6/10* (2006.01)

(52) U.S. Cl.
USPC .............. 257/623; 385/132; 438/31; 257/626

(58) Field of Classification Search
USPC .............. 438/31; 257/14, 623, 626, E21.214; 385/132
See application file for complete search history.

(56) References Cited

U.S. PATENT DOCUMENTS

| 6,667,529 B2 | 12/2003 | Takagi | |
|---|---|---|---|
| 2005/0013334 A1* | 1/2005 | Watanabe et al. | 372/44 |
| 2005/0190416 A1* | 9/2005 | Yoneda | 359/27 |
| 2006/0056473 A1* | 3/2006 | Tanigawa et al. | 372/43.01 |
| 2008/0197377 A1* | 8/2008 | Sudo et al. | 257/99 |
| 2010/0177799 A1* | 7/2010 | Watanabe et al. | 372/45.01 |

FOREIGN PATENT DOCUMENTS

JP  2009-244648  10/2009

* cited by examiner

*Primary Examiner* — Kevin Parendo
(74) *Attorney, Agent, or Firm* — Smith, Gambrell & Russell, LLP (57) ABSTRACT

A process to manufacture a semiconductor optical modulator is disclosed, in which the process easily forms a metal film including AuZn for the p-ohmic metal even a contact hole has an enhanced aspect ration. The process forms a mesa including semiconductor layers first, then, buries the mesa by a resin layer sandwiched by insulating films. The resin layer provides an opening reaching the top of the mesa, into which the p-ohmic metal is formed. Another metal film including Ti is formed on the upper insulating film along the opening.

17 Claims, 9 Drawing Sheets

SEMICONDUCTOR OPTICAL MODULATOR AND METHOD FOR MANUFACTURING THE SAME

BACKGROUND OF THE INVENTION

1. Field of the Invention

The present invention relates to a semiconductor optical modulator and a method to manufacture the semiconductor optical modulator.

2. Related Background Arts

The U.S. Pat. No. 6,667,529, has disclosed a semiconductor optical modulator and a method to manufacture the same. The optical modulator, which is made of semiconductor materials able to grow epitaxially on an InP substrate, includes an anode made of a metal stack of titanium (Ti) and gold (Au). The Ti in the anode is in contact with the contact layer made of InGaAsP. A Japanese Patent Application published as JP-2009-244648A has disclosed another semiconductor optical modulator. The modulator disclosed therein includes a waveguide layer made of InGaAsP, an n-type InP buffer layer beneath the waveguide layer, an insulating InP layer covering the top and sides of the waveguide layer, and an n-type InP layer on the insulating InP layer. One of paired electrodes to apply an electric field in the waveguide layer is in contact with the InP buffer layer, while the other electrode is on the n-type InP layer.

Figure 9:
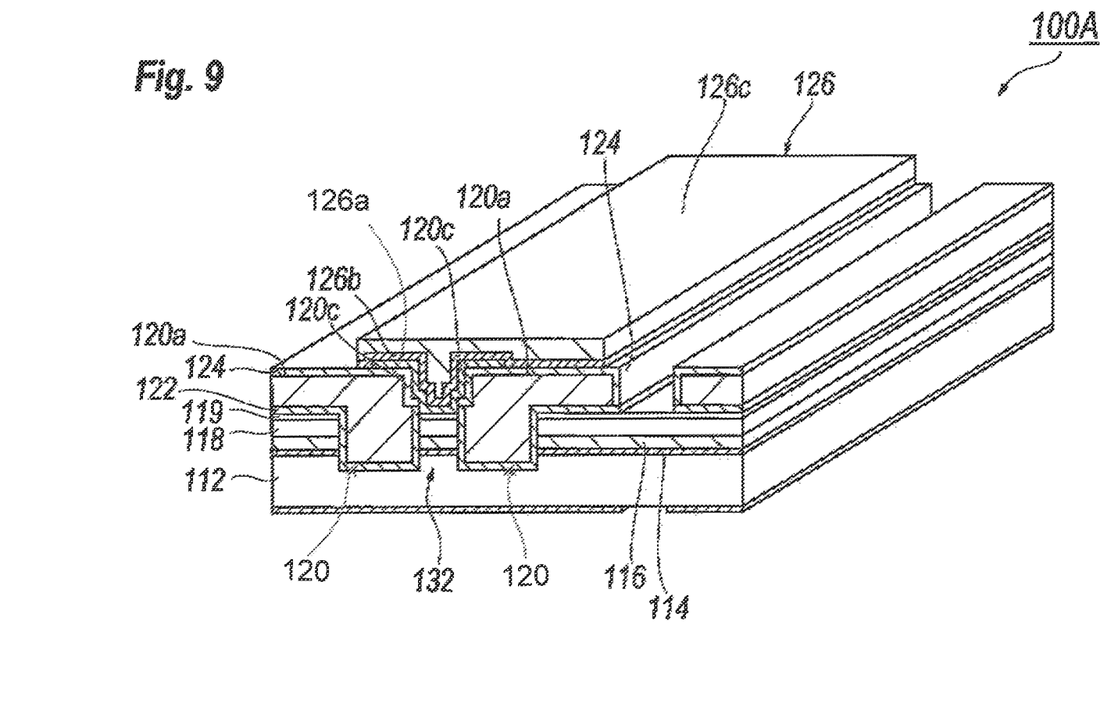
FIG. 9 is a perspective view showing a semiconductor optical modulator having a conventional arrangement.

FIG. 9 is a perspective view of a conventional semiconductor optical modulator 100A that includes (1) a mesa 132 formed by etching a semiconductor layers on an n-type InP substrate 112, an n-type InP buffer layer 114, a core layer 116 of a multiple quantum well (MQW) type structure, a p-type upper cladding layer 118 made of InP, and a p-type contact layer 119 made of InGaAsP or InGaAs; (2) a resin layer 120 covering the sides of the mesa 132, and (3) the anode metal 126 including a first metal 126a, a second metal 126b, and a pad 126c. The first metal 126a, which is in contact with the contact layer 119 in the top of the mesa 132, may be a double layer of eutectic metal AuZn and gold Au to secure the ohmic contact with the contact layer 119, while, the second metal 126b may be a double layer of titanium (Ti) and gold (Au). The eutectic metal AuZn extends on the top of the resin layer 120 through an insulating film 124, which is generally made of an inorganic material, for instance, $SiO_2$, SiN, or SiON. However, because the eutectic metal of AuZn shows inferior adhesion against the inorganic material, the metal 126a is easily peeled off from the insulating film 124.

One solution avoid peel-off of the metal 126a from the insulating film 124 is that the eutectic metal 126a is restrictedly formed within the opening 120c formed in the resin layer 120 in the top of the mesa 132 not to extend to the top 120a of the resin layer 120. However, it is strictly hard to execute the photolithography process within the restricted region of the opening 120c on the top of the mesa 132, because the resin layer 120 has a thickness greater than 2 μm or more because of the reduction of the parasitic capacitance between the anode electrode 126 and the semiconductor layers, 112 to 119.

SUMMARY OF THE INVENTION

One aspect of the present invention relates to a process to manufacture a semiconductor optical modulator. The process includes steps of: (a) forming a mesa on the semiconductor substrate, where the mesa includes a plurality of semiconductor layers including a core layer to guide light; (b) burying the mesa by an insulating layer; (c) exposing a top of the mesa by forming an opening in the insulating layer; (d) forming the first metal film along the opening but without an inside of the opening on the insulating layer, where the first metal film includes Ti; and (e) covering the exposed top of the mesa and the first metal film on the insulating layer by the second metal film, where the second metal film includes a p-contact metal.

Because the process of the present invention forms the first metal film including Ti on the insulating layer in advance to form the second metal film making in directly contact with the mesa, not only the second metal film may be secured from peeled off from the insulating layer but the photolithographic works for the second metal film may be simplified even when the insulating layer is formed in thick and the opening to expose the top of the mesa has an enhanced depth. The process according to the present invention may change the step to form the first metal and the step to expose the top of the mesa.

Another aspect of the present invention relates to a semiconductor optical modulator that may enhance the reliability of the ohmic metal for the p-type semiconductor material. The optical modulator of the present invention provides an additional metal film including Ti between the p-contact metal and the insulating layer. The additional metal may enhance the adhesion to the insulating layer, and the p-contact metal may be escaped from the peeling off from the insulating layer.

BRIEF DESCRIPTION OF THE DRAWINGS

Non-limiting and non-exhaustive embodiments of the present invention will be described with reference to the following figures, wherein like reference numerals refer to like parts throughout the various figures unless otherwise specified.

DETAILED DESCRIPTION OF PREFERRED EMBODIMENTS

Next, a semiconductor optical modulator and a method to manufacture the optical modulator according to an embodiment of the present invention will be described as referring to accompanying drawings. In the description of the drawings, the elements same with or similar to each other will be referred by the numerals or the symbols same with or similar to each other.

Figure 1:
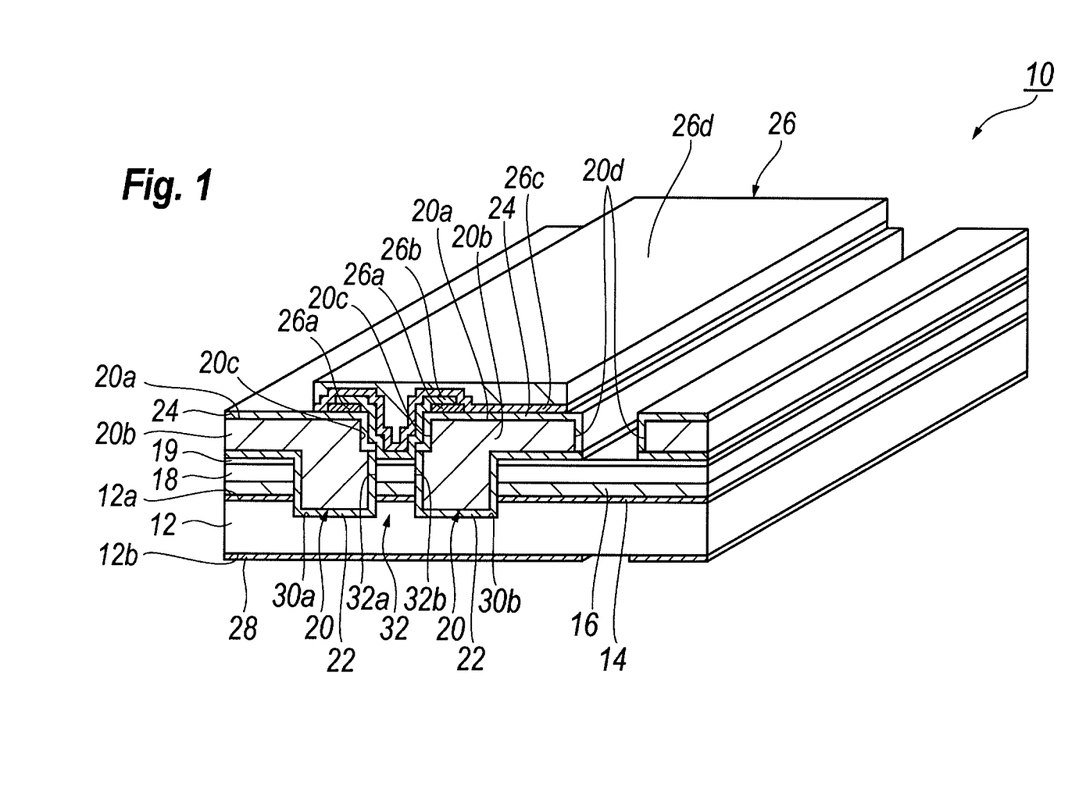
FIG. 1 is a perspective view showing a semiconductor optical modulator according to an embodiment of the present invention.

FIG. 1 is a perspective view showing a semiconductor optical modulator 10 according to an embodiment of the present invention. The optical modulator 10 shown in FIG. 1 includes a semiconductor substrate 12, a buffer layer 14, a core layer 16, an upper cladding layer 18, a contact layer 19, a resin layer 20, an insulating films, 22 and 24, an anode 26, and a cathode 28.

The semiconductor substrate 12 may be made of group III-V compound semiconductor material having the first conducting type, for instance, the n-type conduction. The embodiment shown in FIG. 1 has the semiconductor substrate 12 made of an n-type InP and has a primary surface 12a and a back surface 12b. The buffer layer 14 arranged on the semiconductor substrate 12 also may be made of group III-V compound semiconductor material with the first conducting type, typically an n-type InP epitaxially grown on the semiconductor substrate 12. The buffer layer 14 may suppress the degradation of the crystal quality of the core layer grown thereon.

The core layer 16 grown on the buffer layer 14 may include a plurality of well layers and barrier layers alternately stacked each other, which is generally called as the multiple quantum well (MQW) structure. In an alternative, the core layer 16 may have a single well layer put between barrier layers, which is often called as the single quantum well (SQW) structure, or the core layer 16 may have a bulk structure made of single semiconductor material. The core layer 16 also may be made of group III-V compound semiconductor material. The embodiment shown in FIG. 1 has the well layer made of AlGaInAs while the barrier layer made of AlInAs.

The upper cladding layer 18, which is grown on the core layer16, may be made of group III-V compound semiconductor material but showing the second conducting type, for instance, the p-type conduction. The device 10 shown in FIG. 1 has the upper cladding layer 18 made of p-type InP. The upper cladding layer 18 may confine light within the core layer 16. The contact layer 19, which is arranged on the upper cladding layer 18, may be also made of group III-V compound semiconductor material with the second conducting type. The device 10 shown in FIG. 1 has the contact layer 19 made of p-type InGaAsP or p-type InGaAs. The contact layer 19 may show the ohmic characteristic against the anode 26.

The device 10 has two grooves, 30a and 30b, to form the mesa 32. These grooves, 30a and 30b, each extend in a direction along which the light propagates, and have a depth reaching the semiconductor substrate 12. The grooves, 30a and 30b, may be formed by etching the contact layer 19, the upper cladding layer 18, the core layer 16, and the buffer layer 14 to expose the semiconductor substrate 12. Sides, 32a and 32b, of the mesa 32 are respective walls of the grooves, 30a and 30b.

The mesa 32 shows a function of the optical waveguide. That is, the light may propagate primarily within the core layer 16 as being confined laterally by a difference in the refractive index thereof against sides, 32a and 32b, of the mesa 32 and vertically also by the difference in the refractive index thereof against the upper cladding layer 18 and the buffer layer 14.

The resin layer 20 may bury the sides, 32a and 32b, of the mesa to provide an area for pads 26d of the anode 26. The resin layer 20 filled in respective grooves, 30a and 30b, may effectively suppress unintentional scattering or absorption of the light propagating within the waveguide of the mesa 32. The resin layer 20 of the present embodiment has a thickness greater than a depth of the grooves, 30a and 30b, to reduce parasitic capacitance of the anode 26. The resin layer 20 also extends laterally over the grooves, 30a and 30b, to form a thinned region 20b whose top 20a compared to the top of the mesa 32, namely, a thickness of the resin layer 20 in the thinned region 20b is preferably greater than 2 μm to reduce the parasitic capacitance but less than 3 μm to facilitate the process. The resin layer 20 may be made of benzo-cyclobutene (BCB), polyimide, or AL polymer produced by Asahi Glass Co. Ltd.

The resin layer 20 provides two openings, 20c and 20d. The former opening 20c is formed in a position corresponding to the mesa 32 to arrange the anode 26 therein. The latter opening 20d is formed in a boundary of an area for the optical modulator 10. The latter opening 20d exposes the contact layer 19 in the bottom thereof. Dividing respective areas for the device along the latter opening 20d, the semiconductor optical modulator 10 may be completed in the wafer process.

The insulating film 22 may be made of inorganic material such as silicon die-oxide ($SiO_2$), silicon nitride (SiN), and silicon oxi-nitride (SiON). The insulating film 22 may protect and electrically isolate the mesa 32 and other semiconductor layers from ambient conditions. Specifically, the insulating film 22 covers respective sides, 32a and 32b, of the mesa 32; sides and bottom of the grooves, 30a and 30b; and the surface of the contact layer 19. The insulating film 22 is put between those regions described above and the resin layer 20.

Another cover layer 24, namely, the second insulating film 24 also may be made of inorganic material such as $SiO_2$, SiN, and SiON; and cover the top 20a of the resin layer 20 and inner surfaces of the first opening 20c thereof. The second insulating film 24 may protect the resin layer 20 from external moisture. The resin layer 20 combined with two insulating films, 22 and 24, constitute the insulating layer to bury the mesa 32.

Two insulating films, 22 and 24, each has an opening substantially common to each other in a position corresponding to the mesa 32 to show a function of a via hole. That is, the common opening exposes the top of the mesa 32 to make the anode 26 electrically in contact with the contact layer 19. Thus, the anode 26 extends from the top of the mesa 32 to the top of the resin layer 20a. The anode 26 includes the pad 26d.

The anode 26 will be further described. The anode 26, which has the first metal film 26a of the present embodiment, includes titanium (Ti). For instance, the metal film 26a may be made of Ti; or a stack of titanium and gold (Ti/Au); a stack of titanium, platinum and gold (Ti/Pt/Au), and so on. The metal film 26a may be formed on the second insulating film 24, specifically, in a region on the second insulating film 24 close to and along the opening 20c. Because Ti is the lowest metal in contact with the second insulating film 24, adhesion between the anode 26 and the second insulating film 24 may be enhanced.

On the other hand, the second metal film 26b of the anode 26 may include a composite of gold and zinc (Au/Zn). For instance, the metal film 26b may be a stack of AuZn and Au. The second metal film 26b covers the top of the mesa 32 in the first opening 20c to be in contact with the contact layer 19 to show the non-rectifier contact. The p-contact metal 26b to the contact layer 19 described above may be an alloyed contact to the layer 19, that is, the composite or the stack may be alloyed at about 370° C. for about 30 seconds to have the non-rectifier contact. In an occasion, the p-contact 26b may be a type of the non-alloyed contact.

The third metal film 26c of the anode 26 may show the function of the barrier metal and includes Ti. For instance, the third metal film 26c may be a stack of Ti/Pt/Au, Tiw/Au and so on. The third metal film 26c is in contact with the second insulating film 24 in a region outside of the first metal film 20a. Because the lowest metal in the third metal film 26c includes Ti, the adhesion to the second insulating film 24 may be enhanced. The pad 26d is provided for connecting the anode 26 electrically with the external by attaching a bonding wire thereto. The pad 26d is formed on the third metal film 26c and may be made of gold plated thereto.

The cathode 28 is formed in the back surface of the semiconductor substrate 12. The cathode 28 may be made of composite of AuGe/Au, AuGe/Ti/Pt/Au, and so on. Because the eutectic metal of AuGe provided in the lowest material is in contact with the n-type substrate 12, the non-rectifier contact to the substrate 12 may be realized. A region in the back surface of the substrate 12 corresponding to the second opening 20d of the resin layer 20 removes the cathode 28 to expose the surface 12b of the substrate 12 to facilitate the dicing of the substrate 12.

Figure 2:
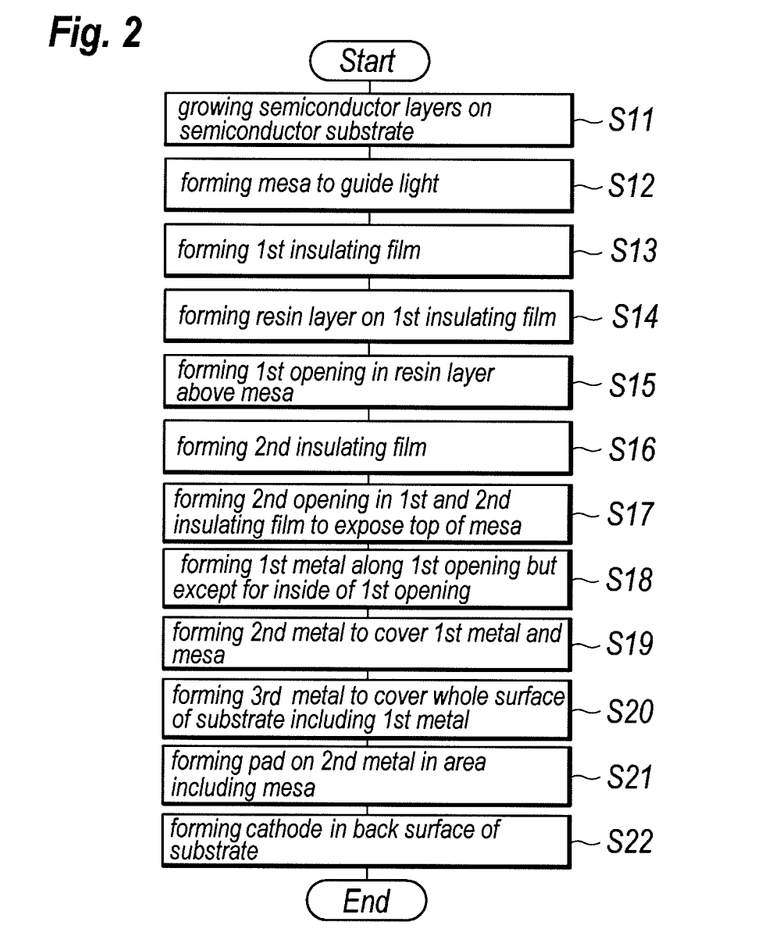
FIG. 2 shows a flow chart to manufacture the optical modulator shown in FIG. 1.

Next, a method to manufacture the optical modulator 10 having the structure thus described will be explained. FIG. 2 is a flow chart of the manufacturing process of the modulator 10, while, FIGS. 3 to 6 are cross sections showing the device during respective steps of the manufacturing process.

Figure 3A:
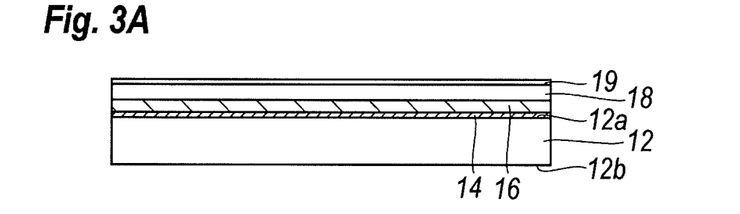
FIGS. 3A, to 3D show cross sections of the semiconductor optical modulator under the process to form the optical modulator shown in FIG. 1.
Figure 3B:
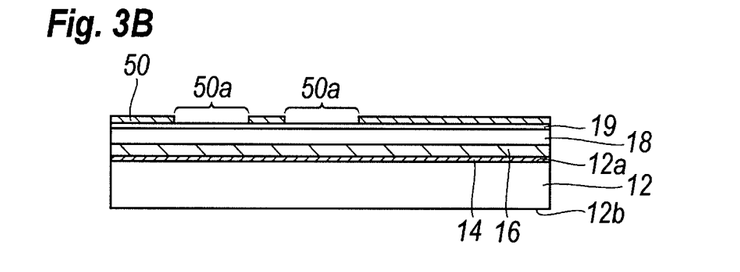

First, the process grows the buffer layer 14, the core layer 16, the upper cladding layer 18, and the contact layer 19 in this order on the primary surface 12a of the semiconductor substrate 12 at step S11 (FIG. 3A). Then, an etching mask 50 covers the top of the contact layer 19 as shown in FIG. 3B. The etching mask 50 may be made of, for instance, $SiO_2$ and has two openings 50a formed by a conventional photolithographic techniques and subsequent etching, where each of the openings corresponds 50a to the grooves, 30a and 30b, to form the mesa 32.

Figure 3C:
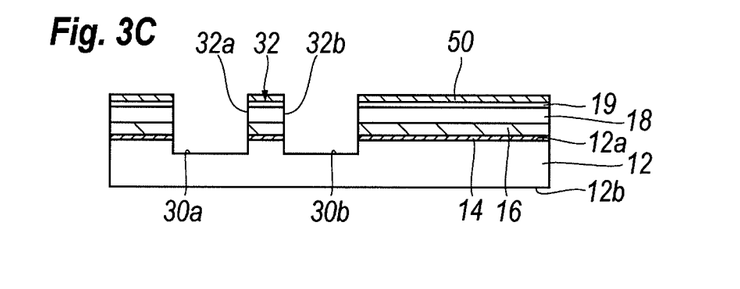

Next, the process forms two grooves, 30a and 30b, by etching the contact layer 19, the upper cladding layer 18, the core layer 16, and the buffer layer 14 sequentially as using the etching mask 50 to form the mesa 32 with two sides, 32a and 32b, at step S12. The etching to remove semiconductor layers, 19 to 14, may be performed by, what is called dry-etching to get steep and plane edges, 32a and 32b, which makes the propagation of the light smooth and satisfactory. When the semiconductor layers stacked and grown on the InP substrate 12, which means that semiconductor layers have a lattice constant substantially equal to or similar to that of InP, such as the present embodiment, the etching is preferably carried out by the induction coupled plasma (ICP) etching. The mesa 32 thus etched by the dry-etching has a width of greater than 1 µm but less than 2 µm, and a height of, which is equivalent to the depth of the grooves, 30a and 30b, greater than 3 µm but less than 4 µm.

Figure 3D:
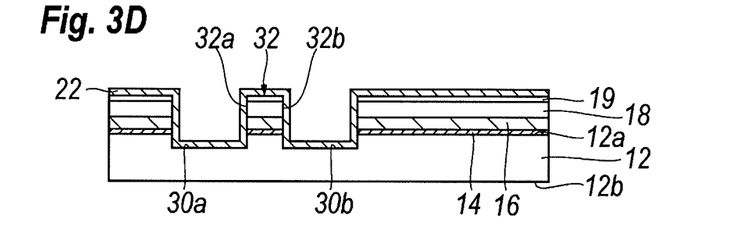

The process then forms the cover layer 22 at step S13, namely, the first insulating film, so as to cover the top and sides, 32a and 32b, of the mesa 32, walls of the grooves, 30a and 30b, and the top of the contact layer 19 exposed outsides of the grooves, 30a and 30b, which is illustrated in FIG. 3D. The second insulating film 22 may be made of, for instance, $SiO_2$, SiON, SiN and so on.

Figure 4A:
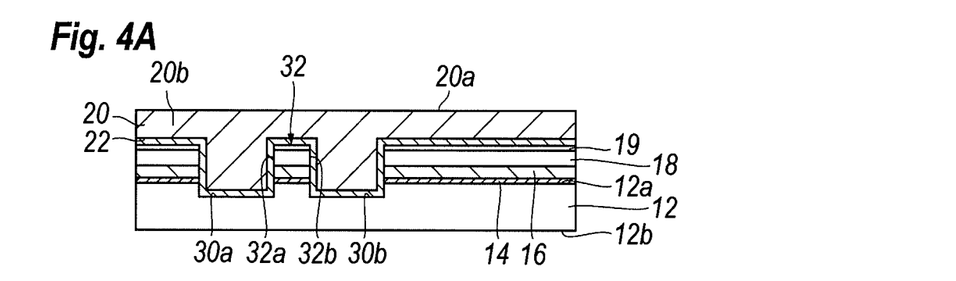
FIGS. 4A, to 4D show cross sections of the semiconductor optical modulator under the process to form the optical modulator subsequent to that shown in FIG. 3D.
Figure 4B:
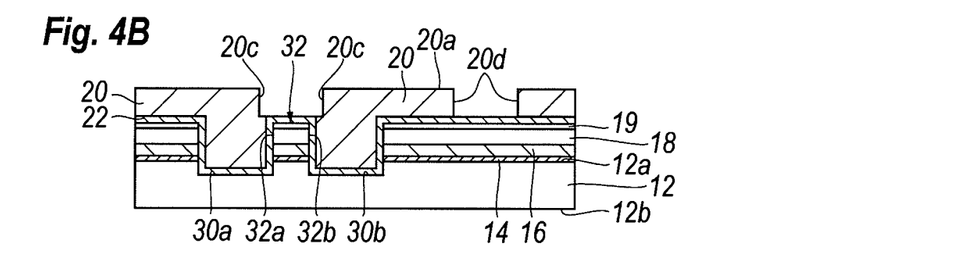

The resin layer 20 is subsequently formed at step S14. Specifically, the process firstly coats a resin on the whole surfaces of the substrate 12 at step S15 as shown in FIG. 4A, which may bury the grooves, 30a and 32a, and form a region 20b outside of the grooves, 30a and 30b, with a plane top surface 20a, which is shown in FIG. 4A. Then, the process forms an opening 20c, which is the first opening, in a position of the resin 20 corresponding to the mesa 32 to expose the cover layer 22, as shown in FIG. 4B. The dry-etching using carbon fluoride ($CF_4$) and/or oxygen ($O_2$) may preferably form the opening 20c. The process may concurrently form another opening 20d, which is the second opening, in the outside region 20b of the resin layer 20. The width of the first opening 20c is slightly wider than a width of the mesa 32, while, the width of the second opening 20d may be, for instance, 100 µm.

Figure 4C:
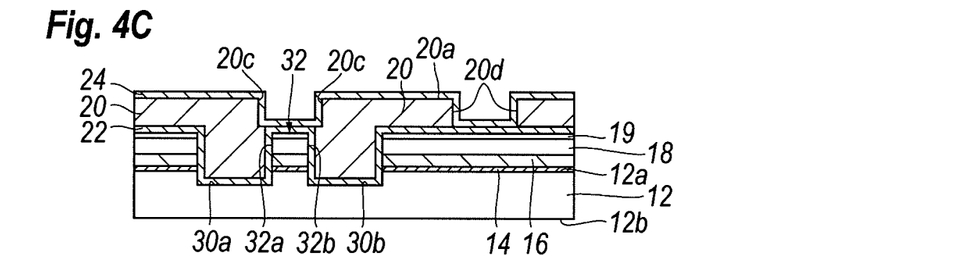
Figure 4D:
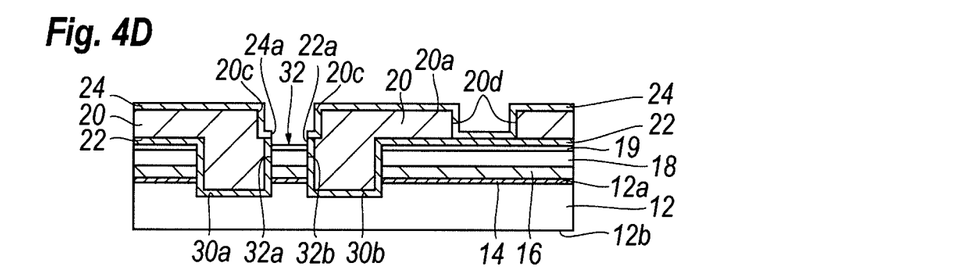

The process subsequently forms another cover film 24, namely, the second insulating film, at step S16 as shown in FIG. 4C. The second insulating film 24, which may be also made of $SiO_2$, SiON, SiN, and so on, covers a surface of the first insulating film 22 exposed within the two openings, 20c and 20d, and the surface 20a of the resin layer 20. Then, the process forms openings, 22a and 24a, in the first and second insulating films, 22 and 24, respectively, to expose the top of the mesa 32 at step S17 as shown in FIG. 4D. Two openings, 22a and 24a, constitutes the via hole combined with the other. The width of the openings, 22a and 24a, is preferably narrower than the width of mesa 32.

Figure 5A:
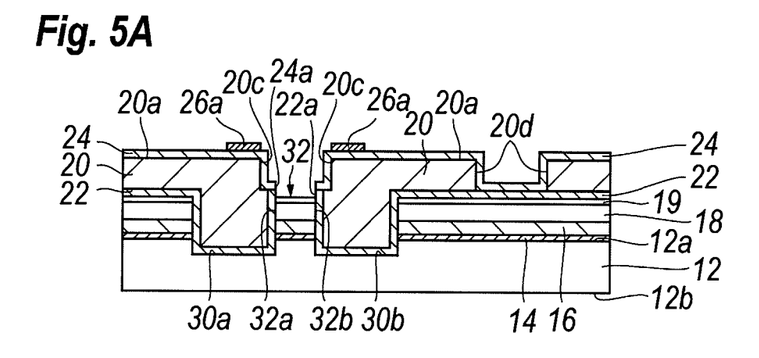
FIGS. 5A, to 5C show cross sections of the semiconductor optical modulator under the process to form the optical modulator subsequent to that shown in FIG. 4D.

Next, the first metal film 26a covers a portion of the surface 20a of the resin layer 20 except for a region within the opening 20c at step S18. Specifically, the first metal film 26a, which may be made of titanium (Ti) covers a region on the surface 20a of the resin layer 20 along the opening 20c. A platinum (Pt) film may cover the Ti film, and a gold (Au) film may further cover the Pt film; that is, the first metal film 26a formed along the opening 20c may be made of a stack of Ti, Pt, and Au (Ti/Pt/Au). Respective metals may be formed by, for instance, sequential processes of the metal evaporation or sputtering and the lift-off by using the photolithography technique. The metal film 26a, which may have a total thickness of about 200 nm, is in contact with second insulating film 24.

Figure 5B:
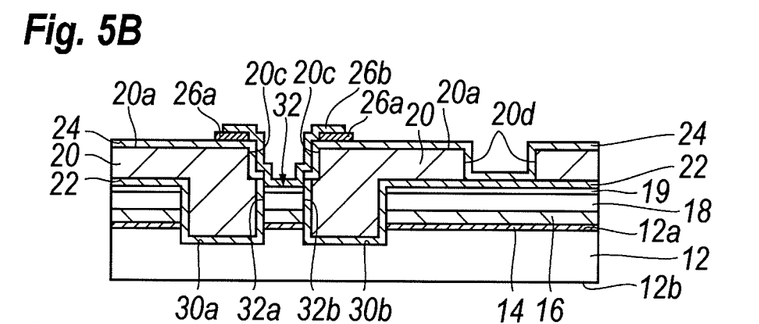

The process may form another metal film 26b, namely, the second metal film, to cover the first metal film 26a at step S19 as shown in FIG. 5B. Specifically, a gold (Au) film first covers the bottom and the sides of the opening 20c, and the first metal film 26a on the top of the resin layer 20; then, another metal made of zinc (Zn) covers thus formed Au film. Finally, another Au film covers the Zn film. Thus, a tri-layer of Au/Zn/Au covers the whole device including the opening 20c, the first metal film 26a, and the top 20a of the resin layer 20. The second metal of Au/Zn/Au may be also formed by the sequential process of the metal evaporation or sputtering, and the lift-off. Instead of the tri-layer of Au/Zn/Au, a double layer of a eutectic metal of AuZn and an Au (AuZn/Au) may be processed. The AuZn film in the second metal film 26b is in contact with the contact layer 19 to show the ohmic contact. The second metal film 26b thus formed preferably has a thickness of about 40 nm and is subsequently alloyed to show the non-rectifier contact against the contact layer 19.

Figure 5C:
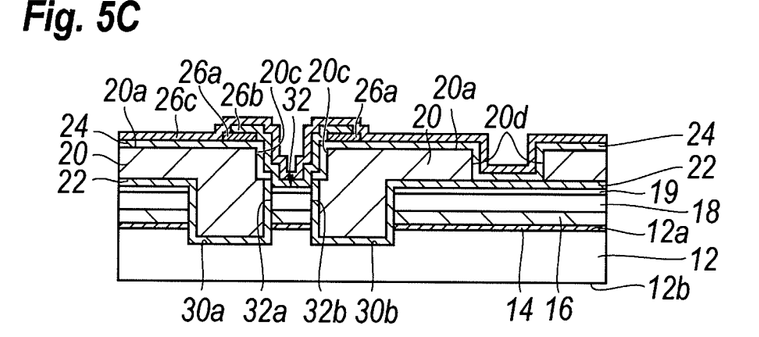

The process further forms the third metal film 26c on the whole surface 12a of the substrate 12 at step S20 as shown in FIG. 5C. Specifically, a Ti film is first deposited, a Pt film is subsequently formed on the Ti film, and an Au film is finally formed on the Pt film by the metal evaporation or sputtering. In an alternation, a TiW film may be first deposited, then, an Au film is superposed on the TiW film. The third metal film 26c may show the function of the barrier material to prevent the inter diffusion of metals.

Figure 6A:
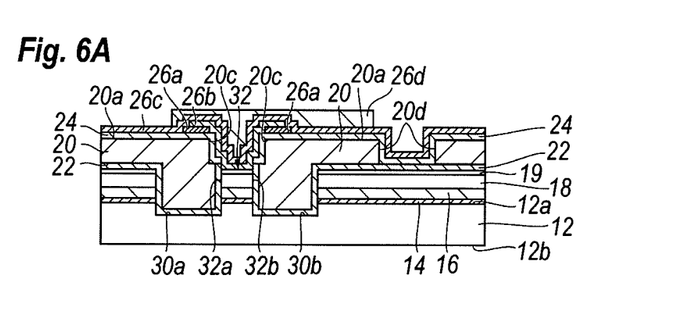
FIGS. 6A to 6D show cross sections of the semiconductor optical modulator under the process to form the optical modulator subsequent to that shown in FIG. 4D.
Figure 6B:
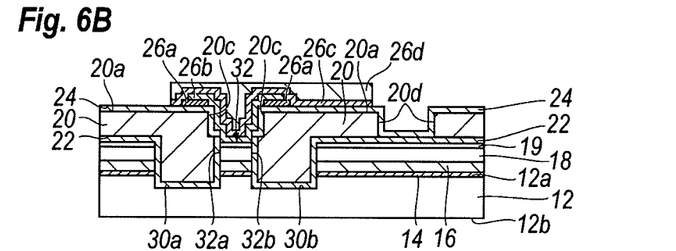
Figure 6C:
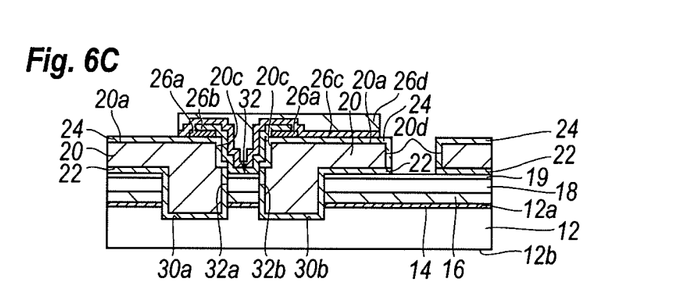

The pad 26d is subsequently formed on the third metal 26c so as to include the mesa 32 by, for instance, the gold plating, at step S21 shown in FIG. 6A. Then, residual portion of the third metal 26c exposed from the plated metal 26d is removed as shown in FIG. 6B. Moreover, insulating films, 22 and 24, exposed within the second opening 20d are also etched to expose the top of the contact layer 10, as shown in FIG. 6C.

Figure 6D:
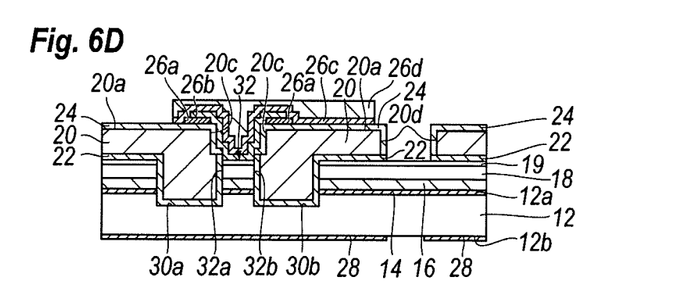

The process then forms the cathode 28 in the back surface 12b of the substrate 12 at step S22. The cathode 28 may be made of eutectic metal of AuGe stacked with the Au film thereon. The Au film may be replaced by metal tri-layers of Ti/Pt/Au. The eutectic metal AuGe may show the non-rectifier contact against the n-type substrate 12. The cathode 12b in a portion corresponding to the second opening 20d is finally removed to form the scribe line (FIG. 6D). Dividing the substrate 12 along the second opening 20d, the semiconductor optical modulator 10 is completed.

The optical modulator 10 and the process thereof has a feature that the first metal film 26a is arranged along the opening 20c of the resin layer 20 on the second insulating film 24. The first metal film 26a includes Ti as the first metal in contact with the second insulating film 24 to secure the adhesion against the insulating film 24 made of inorganic material such as, $SiO_2$, SiN, or SiON. Accordingly, the first metal film 26a may prevent the second metal film 26b provided thereon from peeling off from the second insulating film 24.

Because the second metal film 26b has the edge thereof outside of the opening 20c of the resin layer 20, the lift-off process for the second metal film 26b may be facilitated. Specifically, a resist pattern to form the second metal film 26b by the lift-off process shown in FIG. 5B may have a widened opening. Accordingly, even the opening 20c has a narrower width; the conditions of the lithographic works to from the resist pattern above may be moderate. Because the present process may form a thicker resin layer, 2 μm or more independent of the photolithography, the high frequency performance of the modulator 10 may be secured.

Because the first metal film 26a is disposed along the opening 20c but except for the inside of the opening 26a, the second metal film 26b including AuZn may be securely in contact with the contact layer, which may reduce the contact resistance against the p-type contact layer 19.

The second metal film 26b is preferably formed at step S19 continuously to the formation of the first metal film 26a at step S18. That is, the second metal film 26b may be deposited just after the deposition of the first metal film 26a without exposing the surface of the first metal film 26a to the atmosphere. The adhesion between the first metal film 26a of Ti and the second metal film 26b of AuZn may be enhanced. The peeling the second metal film 26b off from the first metal film 26a may be further suppressed.

Even in a case where the surface of the first metal film 26a is exposed to the atmosphere after step S18, a pre-process is preferably adapted for the surface of the first metal film 26a. The slight sputtering against the surface of the first metal film 26a to remove the surface layer of the first metal film 26a is effective as the pre-process.

(Modification)

Figure 7:
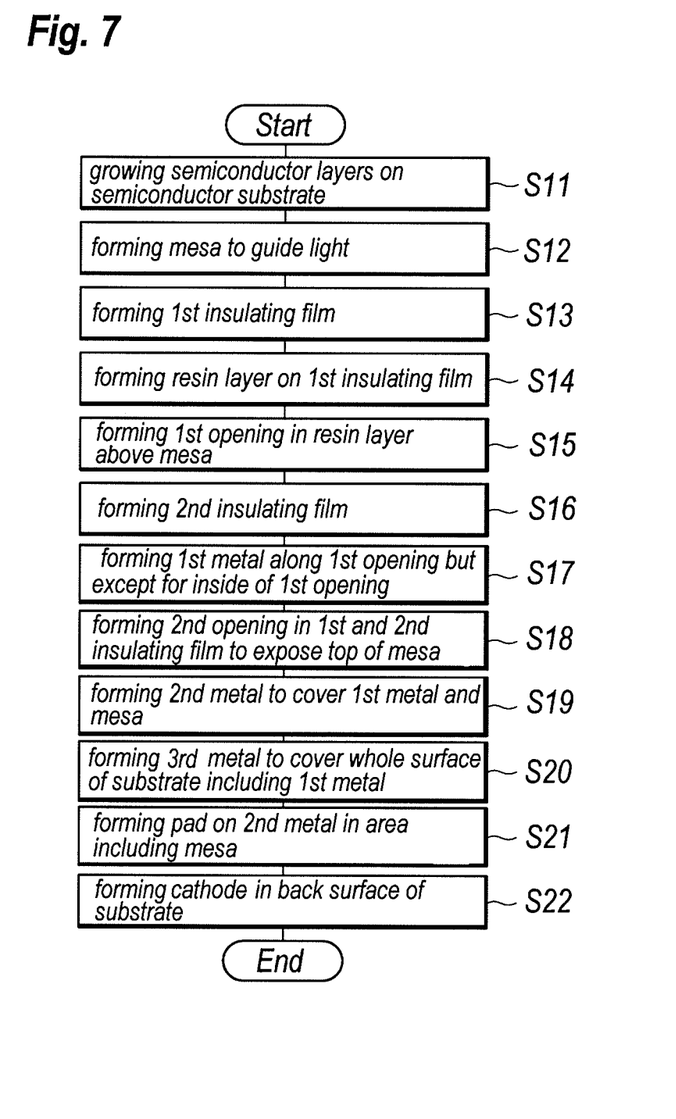
FIG. 7 shows a flow chart to manufacture the optical modulator by a modified process.

One of modifications of the embodiment above described will be explained. FIG. 7 is a flow chart showing another process to manufacture the optical modulator 10, while, FIGS. 8A and 8B show cross sections of primary processes according to the modified embodiment, where the cross sections are taken along the plane perpendicular to the light propagation.

A feature of the modified embodiment distinguishable from the former embodiment is that the process changes the order of the step to form the opening 20c and the step to form the first metal film 26. Specifically, the modified process first grows the semiconductor layers, 14 to 19, on the substrate 12 at step S11, etches those layers, 14 to 19, to form the mesa 32 at step S12, forms the first insulating film 22 to cover the mesa at step S13, buries the mesa 32 by the resin layer 20 at steps S14, then, forms the first opening 20c in the resin layer 20 but leaves the first insulating film 22 as those of the formed embodiment.

Figure 8A:
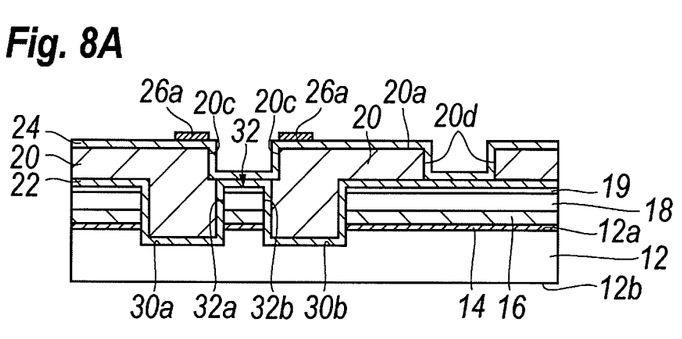
FIGS. 8A and 8B show cross sections of the semiconductor optical modulator under the modified process.
Figure 8B:
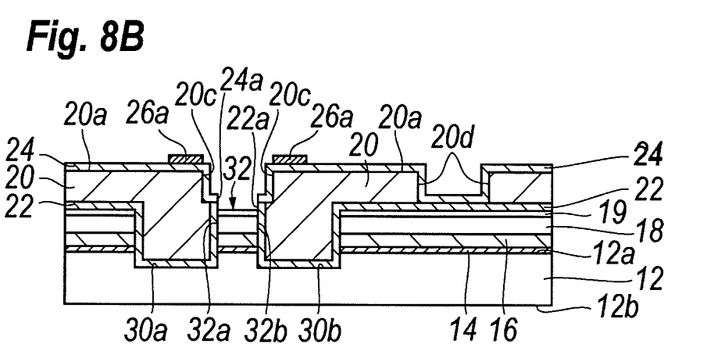

However, the modified process forms the first metal film 26a in advance to form the openings, 22a and 24a, in the first and second insulating films, 22 and 24, at step S18 as shown in FIG. 8A. Materials and conditions of the first metal film 26a are similar to those of the first embodiment. In this process, the top of the contact layer 19 is covered and protected by the first and second insulating films, 22 and 24.

The modified process then etches the first and second insulating films, 22 and 24, to form the openings, 22a and 24a, therein. The top of the contact layer 19 is covered until the insulating films, 22 and 24, are etched in this step S17.

The process may further form the second and third metal films, 26b and 26c, at steps S19 and S20, the pad 20d at step S21, and the cathode 28 in the back surface 12b of the substrate 12 at step S22, as those of the first embodiment. Finally, dividing the semiconductor substrate 12 along the opening 20d, the respective devices of the optical modulator 10 may be completed.

The modified process thus described forms the first metal film 26a on the second insulating film 24 along the opening 20c of the resin layer 20 but without the inside of the opening 20c, which may secure the adhesion of the second metal film 26b against the insulating layer 24 without affecting the electrical characteristics between the second metal film 26b and the contact layer 19. Moreover, the modified process may make it simple to work the photolithography for the second metal film 26b including AuZn even the opening 20c of the resin layer 20 has a restricted width and an enhanced depth.

In the foregoing detailed description, the process and apparatus of the present invention have been described with reference to specific exemplary embodiments thereof. However, it will be apparent that various modifications and changes may be made thereto without departing from the broader spirit and scope of the present invention. For instance, the embodiments described above provide the second insulating film 24 made of inorganic material such as $SiO_2$, SiN, and so on. However, the invention may use other materials for the insulating film, such as, some fluoride of silicon (Si), aluminum (Al), titanium (Ti) and so on, some oxide, or some nitride. Accordingly, the present specification and figures are to be regarded as illustrative rather than restrictive.

What is claimed is:

1. A process to manufacture a semiconductor optical modulator, comprising steps of:
    forming a mesa including a plurality of semiconductor layers on a semiconductor substrate;
    burying the mesa by an insulating layer;
    exposing a top of the mesa by forming an opening in the insulating layer;
    forming a first metal film on the insulating layer, along the opening, so as not to extend within the opening, wherein the first metal film includes titanium (Ti); and
    covering the exposed top of the mesa and the first metal film on the insulating layer by a second metal film, wherein the second metal film includes a p-contact metal having a composite of gold (AU) and zinc (Zn), and directly contacts the first metal film.

2. The process of claim 1,
    wherein the step of burying the mesa including steps of:
    forming a first insulating film to cover the mesa; and
    forming a resin layer to cover the first insulating film.

3. The process of claim 2,
    wherein the step of exposing the top of the mesa includes steps of:
    exposing the first insulating film in a region corresponding to the top of the mesa by etching the resin layer;
    covering the exposed first insulating film and the resin layer by a second insulating film, wherein the second insulating film covers a surface of the resin layer; and etching the second insulating film and the first insulating film sequentially to form the opening in the region corresponding to the mesa.

4. The process of claim 3, wherein the step of covering the first insulating film and the resin layer by the second insulating film includes a step of covering side surfaces of the resin layer exposed in the opening.

5. The process of claim 1, further including, after the step of covering the exposed top of the mesa by the second metal film, alloying the second metal film.

6. The process of claim 1, wherein the second metal film has an edge on the first metal film.

7. A process to manufacture a semiconductor optical modulator, comprising steps of:
forming a mesa in a direction, the mesa including a plurality of semiconductor layers on a semiconductor substrate;
burying the mesa by an insulating layer;
forming a first metal film on the insulating layer along the direction of the mesa, wherein the first metal film includes titanium (Ti);
exposing a top of the mesa by etching the insulating layer; and
covering the exposed top of the mesa and the first metal film formed on the insulating layer by a second metal film, wherein the second metal film includes a p-contact metal having a composite of gold (Au) and zinc (Zn), and directly contacts the first metal film.

8. The process of claim 7, wherein the step of burying the mesa includes the steps of:
forming a first insulating film to cover the mesa;
forming a resin layer to cover the first insulating film;
etching the resin layer in a region corresponding to the mesa to expose the first insulating film; and
covering the exposed first insulating film and the surface of the resin layer with a second insulating film, and
wherein the first insulating film, the resin layer, and the second insulating film constitute the insulating layer that buries the mesa.

9. The process of claim 8, wherein the step of covering the first insulating film and the resin layer by the second insulating film includes a step of covering side surfaces of the resin layer exposed by the etching.

10. The process of claim 8, wherein the step of etching the insulating layer includes steps of:
etching the second insulating film in the region corresponding to the mesa to expose the first insulating film; and
etching the exposed first insulating film to expose the top of the mesa.

11. The process of claim 7, further including, after the step of forming the second metal film, alloying the second metal film.

12. The process of claim 7, wherein the second metal film has an edge on the first metal film.

13. A semiconductor optical modulator, comprising:
a waveguide mesa including a plurality of semiconductor layers;
an insulating layer that buries the mesa, the insulating layer having an opening that exposes a top of the mesa;
a first metal film including titanium (Ti) disposed on the insulating layer and along an edge of the opening without penetrating inside of the opening; and
a second metal film including a p-contact metal having a composite of gold (Au) and zinc (Zn), the second metal film being in direct contact with the exposed top of the mesa in the opening, and in direct contact with the first metal film.

14. The semiconductor optical modulator of claim 13, wherein the insulating layer includes a first insulating film, a resin layer, and a second insulating film,
wherein the first insulating film contacts the mesa, and
wherein the first metal film contacts the second insulating film.

15. The semiconductor optical modulator of claim 13, wherein the opening has a depth greater than 2 μm but less than 3 μm.

16. The semiconductor optical modulator of claim 13, wherein the first metal film includes a stack of titanium (Ti) and gold (Au), titanium tungsten (TiW), or a stack of titanium, platinum, and gold (Ti/Pt/Au).

17. The semiconductor optical modulator of claim 13, wherein the second metal film has an edge on the first metal film.

* * * * *